Sept. 23, 1952     A. G. JOHNSON     2,611,390

RELIEF VALVE

Filed Nov. 14, 1947

INVENTOR.
ANDREW G. JOHNSON
BY
Richey & Watts
ATTORNEYS

Patented Sept. 23, 1952

2,611,390

UNITED STATES PATENT OFFICE 2,611,390

RELIEF VALVE

Andrew G. Johnson, Lakewood, Ohio, assignor to The Weatherhead Company, Cleveland, Ohio, a corporation of Ohio Application November 14, 1947, Serial No. 785,939

3 Claims. (Cl. 137—494)

This invention relates to valves and in its preferred form is directed to a relief valve for the protection of pressure vessels containing liquefied petroleum gas, although the principles of the invention may be employed in various types of valves, and the preferred form of the valve embodying those principles is well suited to the venting of fluids, either gaseous or liquid, upon the occurrence of excessive pressures.

The function of the relief valve is to block the passage of fluid until a pressure is reached for which the valve is preset, whereupon the valve opens to pass fluid until the pressure is reduced, whereupon the valve closes. By employing a spring of low tension, the valve may operate as a check valve.

The principal objects of the invention are to provide a unidirectional valve, such as a relief or check valve which:

Is of high capacity with respect to the size of the valve;

Maintains its pressure setting with a high degree of constancy;

Is free from chatter and irregular operation;

Operates smoothly and with a minimum of friction;

Is protected against accumulations of moisture which might freeze and disable the valve; and Is simple, rugged, reliable, and economical of manufacture.

Other objects and advantages of the invention more or less ancillary in nature, and the manner in which the various objects of the invention are realized, will be apparent to those skilled in the art from the following description.

Referring to the drawings.

Figure 1:
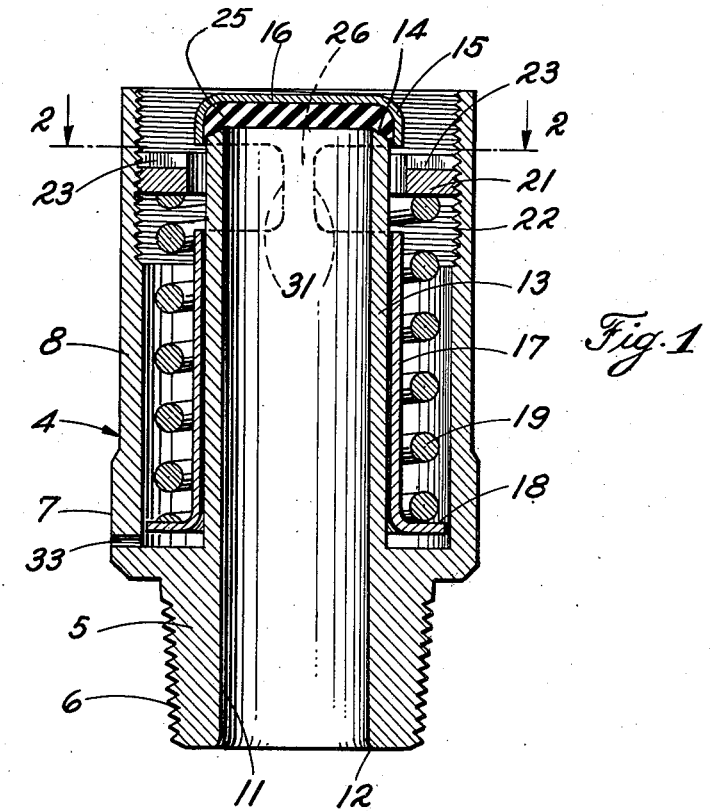
Fig. 1 is an axial section of a relief valve embodying the invention.
Figure 2:
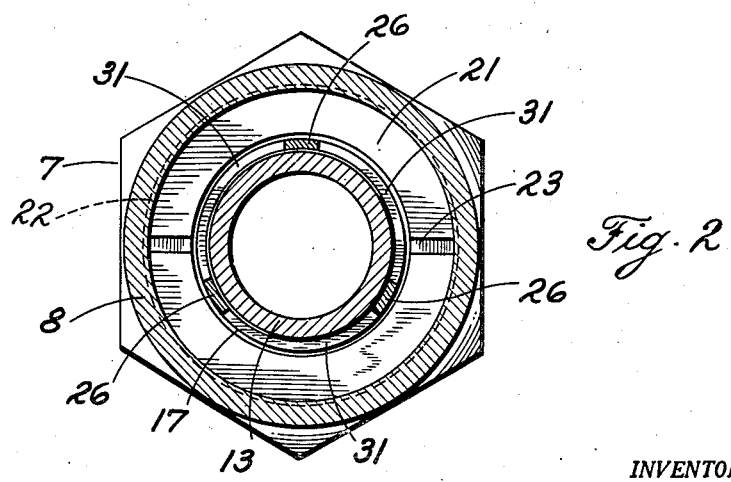
Fig. 2 is a cross-sectional view of the same taken on the plane indicated in Fig. 1.

The form of valve illustrated in Figs. 1 and 2 comprises a body 4, the base 5 of which is formed with external tapered threads 6 or other suitable means for attachment to a fluid reservoir, line, or other fitting. The portion 7 of the body 4 is preferably hexagonal for application of a wrench. The operating parts of the valve are contained within a cylindrical casing 8 preferably integral with the base 5.

Fluid is admitted to the valve through a bore 11 in the base 5, the lower end 12 of which is preferably radiused to promote smooth flow. A central tube 13 preferably integral with the base 5, extends along the axis of the shell 8. Preferably, the inner diameter of the tube 13 is the same as that of the inlet 11, and the sleeve forms a continuation of the inlet. The upper end of the tube is beveled to form a seat 14 for a movable valve member 15 comprising a valve disk 16 which is the base or bottom of a relatively deep cup the cylindrical portion 17 of which is dimensioned for a free sliding fit over the outer surface of the tube 13, and thus constitutes a guide for the valve disk. The valve member 15 is formed with a flange 18 at the lower end which forms a seat for a coil compression spring 19, the upper end of which is seated against an annular retainer 21. The central opening of the retainer 21 is dimensioned for free sliding movement of the valve member 15 therein and its outer margin is threaded for adjustment within interior threads 22 in the upper portion of the shell 8. Radial slots 23 in the retainer are provided for the application of a suitable wrench. The retainer 21 is preferably tack soldered to prevent rotation after the valve is calibrated to the desired relief pressure.

A disk 25 of resilient material such, for example, as artificial rubber, is cemented to the disk 16 so as to engage the seat 14 for effective sealing when the valve is closed. When the pressure within the tube 13 exceeds that for which the spring 19 is set, the force exerted on the disk 25 will lift the valve, sliding the cylinder 17 upwardly along the tube 13.

The upper portion of the cylinder 17 is formed to provide a plurality of discharge openings 31 of large area immediately below the disk 25, through which the fluid is vented when the valve is lifted from its seat. The total area of the openings 31 should be greater than the cross-sectional area of the tube 13 in order to provide maximum flow of gas. Preferably these openings are rectangular, are three in number, and are separated only by relatively narrow portions or tension members 26 of the cylinder 17 so as to provide discharge openings substantially around the entire perimeter of the valve seat 14.

The shell 8 extends slightly beyond the tube 13 so as partially to enclose and protect the valve member 15, to direct the flow of gas upward and outward from the discharge openings 31 when the valve is opened slightly, and to prevent obstruction to the normal upward and outward flow of gas when the valve opens fully.

In the operation of the valve, the valve remains seated until the pressure in the tube 13 exceeds the pre-set value, when the valve will open, the disk 18 being lifted from the seat 14 and the discharge openings 31 moving out of register with the upper portion of the tube 13. As the valve opens, fluid rushing through the valve impinges against the disk 25 at high velocity, the impact of the fluid thus tending to open the valve more fully or hold it open. The fluid escaping from the ports 31 will pass into the atmosphere at an angle to the axis of the valve, in a conical path due to its initial upward velocity and outward deflection by the disk 16. Due to the high velocity of the fluid escaping past the flat outer surface of the disk, a vacuum will be developed above the disk which will further tend to hold the valve from its seat. The forces resulting from the dynamic action of the moving fluid thus assist in opening the valve and eliminate any tendency of the valve to chatter, which tendency is an undesirable characteristic of valves which rely on static pressure of the fluid for their action.

The clear and open discharge path from the ports 31 and the resulting free flow of gas from the valve prevents the development of back pressure above the movable valve member which would tend to urge it toward its seat, or, in other words, promotes the maintenance of a low pressure or vacuum condition immediately above the movable valve member which, as previously stated, tends to open the valve.

The spring 19 has a relatively low rate, the spring tension corresponding to the full open position of the valve being preferably only about 15% greater than the spring tension with the valve closed. It will be noted that the upper face of the spring retainer 21 is below the seat 14 so that the retainer does not obstruct the flow of fluid.

With the valve of the invention, it has been found by experiment that a slightly greater quantity of gas passes through the valve than would pass through a simple orifice of the diameter of the opening 11. With previously known valves, the flow has been considerably less than that which would pass through the entrance to the valve if not otherwise impeded. This increased capacity for a given size of valve has obvious advantages, greater safety with the same size of valve, or equivalent safety with a smaller valve. The high efficiency of the valve is a result of the large discharge ports to eliminate throttling, the very slight interference with straight flow of the fluid from the tube 13, and the arrangement of the casing 8, the guide 17 for the valve, and the seating spring so as not to interfere with the free flow of the gas discharged from the outlets 31.

The valve may open to varying extents depending upon the quantity of fluid to be discharged through the valve. Ordinarily, in its operation as a safety or relief valve, the valve will open wide. It has been found by experiment that the valve passes substantially the same amount of fluid with the cup 15 in place and discharging gas under such pressure that the discharge ports 31 are fully opened as with the cup 15 removed entirely and gas under the same head introduced into the tube 13.

Another advantage of this valve is the relatively long guiding engagement between the sleeve 17 and the tube 13, and the application of the spring force at a point considerably removed from and below the valve seat, eliminating any tendency of the valve to stick or open unevenly.

A vent 33 is drilled through the shell 8 at the lower end of the annular cavity in the casing to drain off any moisture which may collect within the valve. This provision for escape of water is of importance in installations in which the valve is exposed to the elements with the discharge end open so that rain may enter, since any rain collecting in the valve might freeze and interfere with the opening of the valve or the seating thereof. This is particularly important since the discharge from the valve does not blow out the body, and expansion of the escaping gas might freeze water collected in the valve and prevent its closing.

The inlet fitting 5, shell 8, and central tube 13 are disclosed herein as formed from a single piece of metal, but it will be obvious that this structure may be an assembly of two or more component parts.

Although the invention has been described herein as a relief valve, it will be apparent that by the provision of a spring 19 under slight compression, the valve may function as a check valve and retain the advantages of high efficiency and consistent operation it has when used as a relief valve.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. A relief valve comprising a tubular member adapted to communicate at its inner end with a fluid pressure system and having a valve seat at its outer end, a tubular shell surrounding said tubular member and fixed thereto at the inner end of said shell, said shell having an open outer end disposed axially outwardly of said valve seat, a valve member including an end wall carrying a valve closure member arranged to engage and seal against said valve seat and including guide means extending along said tubular member and having spring abutment means extending therefrom adjacent the inner end thereof, a spring retainer mounted in said shell and positioned axially inward from the outer end of said tubular member, a compression spring engaging said spring retainer and said spring abutment means and urging said valve closure member against said valve seat, said valve member having radial openings adjacent the valve closure member, said openings and the outer edge of said tubular member defining a fluid passageway having an area at least substantially equal to the cross-sectional area of the outlet passageway of said tubular member when said valve member is moved outwardly the maximum amount permitted by said spring.

2. A relief valve comprising a tubular member adapted to communicate at its inner end with a fluid pressure system and having a valve seat at its outer end, a tubular shell surrounding said tubular member and fixed thereto at the inner end of said shell, said shell having an open outer end disposed axially outwardly of said valve seat, a cup-shaped valve member including an end wall portion carrying a valve closure member arranged to engage and seal against said valve seat and including a cylindrical guide portion means extending along said tubular member, a spring abutment flange extending from the inner end of said guide portion, a spring retainer mounted in said shell and positioned axially inward from the outer end of said tubular member, a compression spring engaging said spring retainer and said spring abutment flange and urging said valve closure member against said valve seat, the cylindrical portion of said valve member having radial openings adjacent the valve closure member, said openings and the outer edge of said tubular member defining a fluid passageway having an area at least substantially equal to the cross-sectional area of the outlet passageway of said tubular member when said valve member is moved outwardly the maximum amount permitted by said spring.

3. A relief valve comprising a tubular member adapted to communicate at its inner end with a fluid pressure system and having a valve seat at its outer end, a tubular shell surrounding said tubular member and fixed thereto at the inner end of said shell, said shell having an open outer end disposed axially outwardly of said valve seat, a valve member including an end wall carrying a valve closure member arranged to engage the seal against said valve seat and including guide means extending along said tubular member and having spring abutment means extending therefrom adjacent the inner end thereof, a spring retainer mounted in said shell and positioned axially inward of the cone defined by the outer end of said shell and the outer end of said tubular member, a compression spring engaging said spring retainer and said spring abutment means and urging said valve closure member against said valve seat, said valve member having radial openings adjacent the valve closure member, said openings and the outer edge of said tubular member defining a fluid passageway having an area at least substantially equal to the cross-sectional area of the outlet passageway of said tubular member when said valve member is moved outwardly the maximum amount permitted by said spring.

ANDREW G. JOHNSON.

REFERENCES CITED

The following references are of record in the file of this patent:

UNITED STATES PATENTS

| Number | Name | Date |
|---|---|---|
| 240,369 | Blake | Apr. 19, 1881 |
| 727,476 | Starr | May 5, 1903 |
| 772,668 | O'Brien | Oct. 18, 1904 |
| 1,159,687 | Kraft | Nov. 9, 1915 |
| 1,701,305 | Meyers | Feb. 5, 1929 |
| 2,206,356 | Hutchings | July 2, 1940 |
| 2,281,142 | Davis | Apr. 28, 1942 |
| 2,530,091 | Smith | Nov. 14, 1950 |